May 13, 1924.
R. C. COLLEY
1,493,473
TOPOGRAPHIC RECORDING DEVICE
Filed July 20, 1923    2 Sheets-Sheet 1
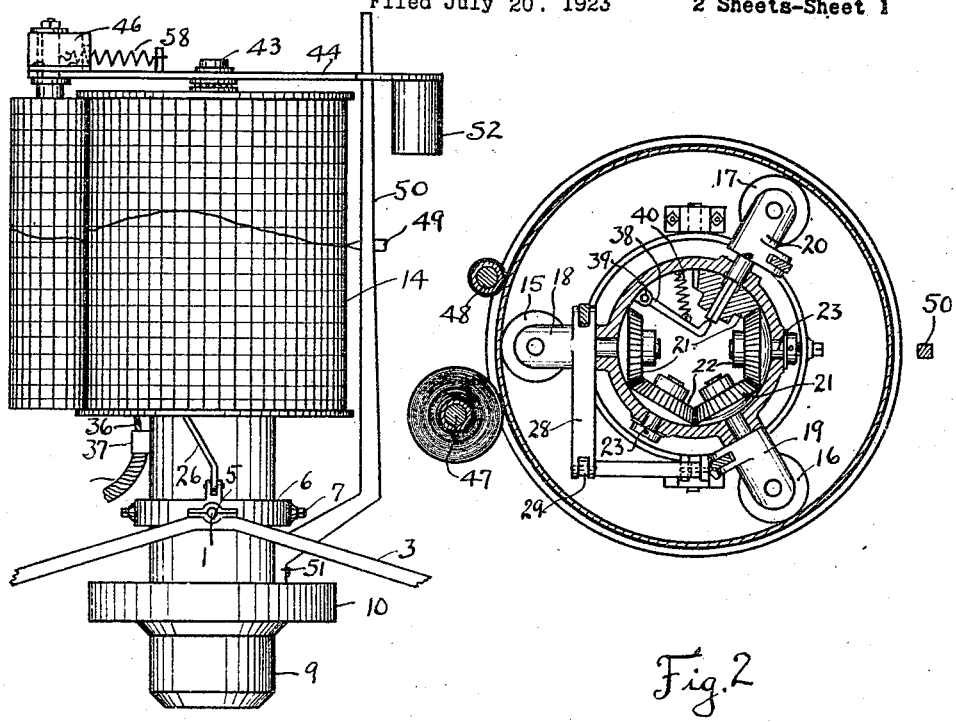
Fig.1    Fig.2
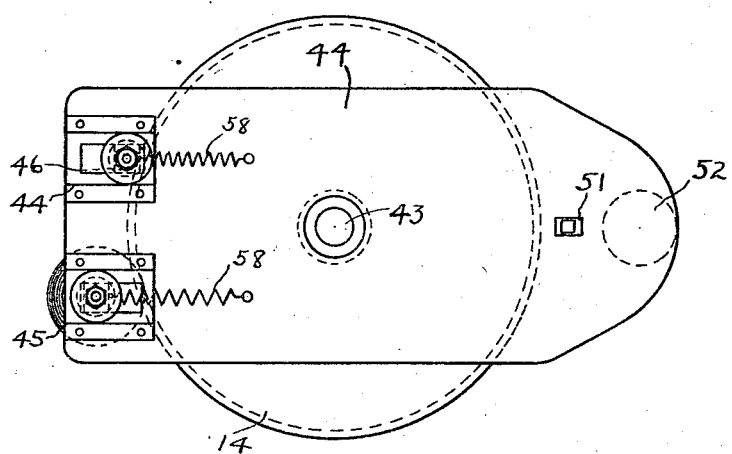
Fig.3  R.C. Colley Inventor
By  Jesse R. Stone
Attorney

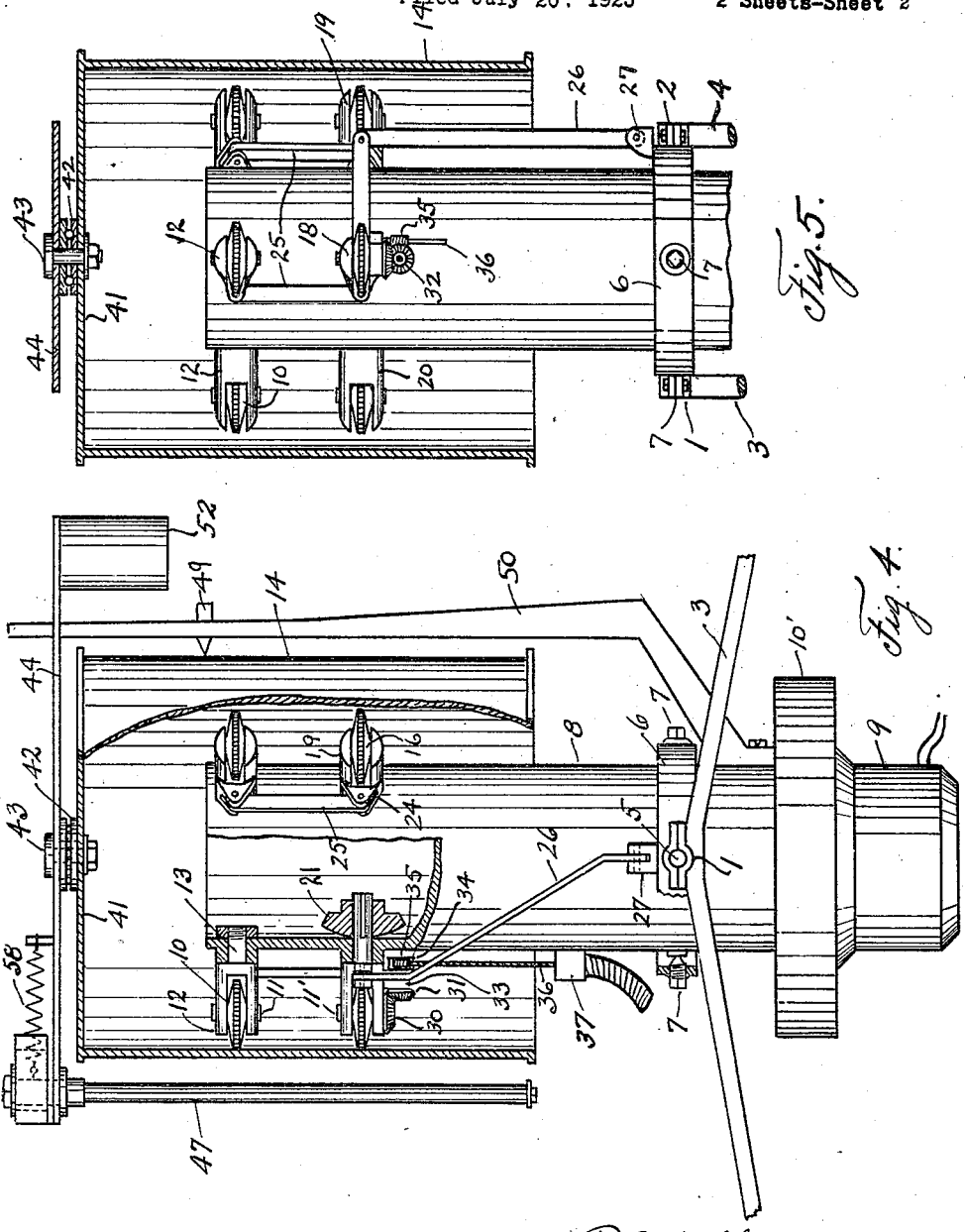

Patented May 13, 1924.

1,493,473

UNITED STATES PATENT OFFICE.

REGINALD C. COLLEY, OF HOUSTON, TEXAS.

TOPOGRAPHIC RECORDING DEVICE.

Application filed July 20, 1923. Serial No. 652,682.

*To all whom it may concern:*

Be it known that I, REGINALD C. COLLEY, a citizen of the United States, residing at Houston, Harris County, Texas, have invented a certain new and useful Improvement in Topographic Recording Devices, of which the following is a full, clear, and exact description, such as will enable others skilled in the art to which it appertains to make and use the same.

My invention relates to devices for recording the elevational curves due to the topography of a country.

It is an object of the invention to provide a device which may be attached to a vehicle or similar support and to be capable of making a record automatically of the comparative elevations of the country over which the vehicle is driven.

The device is designed to record upon prepared paper a graph of the route taken by the vehicle which will indicate the comparative elevations of the roadway travelled. It is of particular use in surveying a roadway for construction or repair, so as to indicate the extent of the grading required, although it is obviously adapted for various uses as will more clearly appear.

Referring to the drawing herewith, wherein like numerals of reference are applied to like parts in all the views, Fig. 1 is a side elevation of a device embodying my invention, Fig. 2 is a horizontal section through the working mechanism of the recorder, Fig. 3 is a top plan view; Fig. 4 is a side elevation showing certain parts broken away for greater clearness, and Fig. 5 is a similar view taken at right angles to the position shown in Fig. 4.

In carrying out my invention I contemplate mounting the device upon the frame of a motor vehicle which is designed to take a position parallel with the roadway. Forward and rear bearings 1 and 2 respectively are formed centrally of supporting rods 3 and 4 inclined downwardly from said bearings for attachment to the frame of the vehicle, not shown, said rods extending transversely of the said frame.

Mounted on bearings 1 and 2 are the trunnions 5 of a collar 6 which acts as a support for the cylindrical tubular head 8, the lower end of which furnishes a housing 9 for a motor, not shown. The housing is enlarged at 10' to accommodate a flywheel forming a gyroscope tending to hold the head 8 in erect vertical position at all times. To allow it to assume such position it is attached to the collar 6 by pivots formed by set screws 7 screwed through the collar 6 at 90 degrees from the trunnions 6 of said collar. The ends of these screws are pointed and bear in small sockets in the side of said head.

Adjacent the upper end of said cylindrical head 8 are mounted three friction rollers, or wheels, 10. These rollers are rotatable on pins 11 supported in the forked ends 12 of pivoted pins 13 projecting radially from the head. The rollers 10 are normally horizontal and have a frictional periphery adapted to bear against the inner wall of the recording cylinder.

Spaced below the three upper rollers 10 are three similar rollers 15, 16 and 17 mounted in the forked heads of pins 18, 19 and 20 respectively. Each of these pins extends through the wall of the head 8 and is squared inside the head to receive a small beveled gear 21. Between gears 21 on pins 18 and 19 is a similar beveled gear 22, and between gears on pins 19 and 20 is a second gear 22. By reference to Fig. 2 it will be noted that the turning of any one of these gears 21 will cause the other two gears 21 to turn in the same direction and to the same extent. The gears 22 are mounted idly on pins 23 in the head. The upper set of rollers is also adapted to turn on their pivot pins 13 in synchronism with the lower rollers. To accomplish this movement each upper and lower roller pin is provided with a laterally extending pair of ears 24 between which is pivoted a connecting link 25. These links serve to cause the upper rollers to turn slightly on their pivots when the lower rollers are thus turned.

Said lower rollers are inclined from the horizontal by means of a connecting lever 26, best seen in Figs. 4 and 5. It is supported at its lower end on the collar 6, directly above one of the trunnions 5, a short lug or boss 27 on said collar serving to effect the attachment as shown. The lever is inclined laterally to a slight extent to a point directly below the end of a second horizontally projecting arm 28 and then is directed upwardly and pivotally attached to the end of said arm at 29.

The arm 28 is formed integrally at its opposite end upon the pin 18 and controls its turning or rotative movement from its normal horizontal position.

The roller 15 is given a constant rotative movement when the vehicle is running along a roadway by a connection with the operating mechanism of the automobile. To effect this the shaft or pin 11' upon which the roller is fixed is extended downwardly and has thereon a small beveled gear 30. This gear meshes with a second similar gear 31 mounted upon a stub shaft 32 in a bearing 33 on the lower side of the pin 18. On the opposite end of the shaft from the gear 31 is a worm gear 34 meshing with an upright worm gear 35 on a flexible shaft 36 which extends downwardly into a bearing 37 and from thereto some source of power such as the speedometer shaft, or other similar drive.

The cylinder 14 previously referred to, is held frictionally in adjusted position upon the rollers 10, 15, 16 and 17 by the firm contact of the rollers with the inner wall of the cylinder. In adjusting the cylinder in position one pair of rollers is allowed to move inwardly, as shown in case of roller 17 in Fig. 2. This gives room for adjustment, and the roller and pin on which it is mounted are then forced outwardly and held there by a lever 38 pivoted on the head at 39 and having a point held against the inner end of the roller pin 20 by means of a spring 40.

The cylinder 14 is closed at the upper end by means of a plate 41, which may be formed integral with the said cylinder. Said plate has a central bearing 42 therein for a central pin 43, upon which is supported and pivotally mounted a plate 44, shown best in Fig. 3. This plate extends beyond the circumference of the cylinder at each side, and on one end has a downwardly extending weight or balance, 52. On the opposite end it is provided with two openings or slideways, 45 45, in which may slide bearing blocks, 46. Said blocks furnish a vertical bearing for two spool shafts, 47 and 48. These shafts are slidable with the bearings to and from the cylinder 14, and are held resiliently toward said cylinder by means of springs 48, 58. The spool shafts are supported entirely at the upper end in spaced relation from the cylinder, and for that reason have a firm bearing in the blocks 46.

It is contemplated that a sheet of prepared paper shall be reeled around the spools formed above the shafts 47 and 48, the paper being reeled from the spool 48 around the cylinder and wound up again upon the adjacent shaft 47. The two shafts being held resiliently toward the cylinder bring the surface of the paper wound thereon against the surface of the cylinder, and the frictional contact of the spools of paper thus provided, against the cylinder causes the spools to rotate so as to wind or unwind the paper thereon as the cylinder rotates, in an obvious manner.

A pen is adapted to bear against this paper and to inscribe a line thereon as the paper is rotated during the progress of the vehicle along the roadway. Such a pen is shown at 49. It is mounted upon an upwardly extending arm 50, which, at its upper end passes through an opening 51 in the plate 44, and at its lower end is extended inwardly and secured by screws or otherwise, to the outer face of the head 8, as shown at 51.

In the operation of this device, it is mounted upon the frame of a vehicle, preferably an automobile, which is then driven along the road or across the field, the topography of which is to be ascertained. The instrument is set with the trunnions 5, which support the head 8, in the longitudinal line of the car frame. The paper is adjusted in position so as to be drawn about the cylinder as the car progresses. The motor 9 at the lower end of the head 8 is set in motion, and it is to be understood that the motor within the casing at 9 is rotatable independently of the head, and its rotation with the flywheel thereon acts as a gyroscope to hold the head always in a vertical position, and this is made possible by the universal connection formed by the two sets of pivots 5 and 7. The rotation of the flexible shaft 36 as the vehicle is operated, causes the rotation of the roller 15, and this motion is so calibrated as to cause the cylinder to rotate at a certain definite rate relative to the rate of progress of the vehicle. This makes it possible to rotate the cylinder in such manner that the vertical lines upon the paper will always indicate a certain distance of progress of the vehicle. When the vehicle goes up an incline, the trunnions 5, which actuate the levers 26 and 28, will be thrown slightly higher or lower on one side than on the other, as the frame of the vehicle is inclined. In that way the rollers bearing against the cylinder are slightly inclined in the same manner as is the vehicle on the roadbed, and as the rollers are inclined it will cause the cylinder to rise or fall as it is rotated, relative to the original position. The pen 49 is stationary, and will mark a line upon the paper which will rise or fall as the vehicle goes up or down along a rolling country. This device may be so adjusted by experiment that the rise or fall of the cylinder relative to the pen 49 will indicate with approximate accuracy the exact amount of rise or fall of the roadway, and will thus indicate the topography of the terrain over which the vehicle progresses. If the progress of the vehicle is upwardly or downwardly for a long stretch so that the mark or line indicated by the pen will tend to run off the lower or upper edge of the cylinder, the cylinder may be loosened upon the rollers therein by releasing the lever 38 against the action of the spring, and allowing rollers 17 to be moved inwardly, thus loosening the tension of the rollers and allowing the cylinder to be again adjusted. A notation may then be made upon the paper to indicate the point of adjustment, and the altitudes may be readily calculated from the graph thus registered upon the paper.

The advantages of this type of instrument will be readily apparent to one skilled in the art. It will make it possible to obtain an approximately accurate registry of the topography of a roadway or a division line across a piece of territory, so that if grading or other work is to be undertaken along this way the amount of work necessary to accomplish this end will be readily ascertained. The use of the device will be a means of accomplishing a large saving in time and labor, and will give a graphic representation of the different altitudes along the road, so that the information may be most readily used.

Having thus described my invention, what I claim as new and desire to protect by Letters Patent is:

1. In a device of the character described, a supporting frame, a cylindrical tubular head, means to hold said head in vertical position, a record cylinder spaced outwardly from said head, friction wheels on said head bearing against the inner wall of said cylinder, means to retain said rollers in planes approximately parallel with the plane of said supporting frame, means to rotate one of said rollers, a recording sheet on said cylinder and a pen mounted on said head and bearing against said sheet.

2. In a device of the character described, a supporting frame adapted to be supported parallel with the plane of the roadway, a tubular head, means to hold said head in vertical position, a record cylinder held in spaced relation outside said head by friction rollers mounted on pins swiveled in said head, means to retain said rollers in planes approximately parallel with said supporting frame, means to rotate said cylinder, a record sheet on said cylinder and a pen bearing on said sheet in the manner described.

3. In a device of the character described a supporting frame, a tubular head mounted thereon, means to retain said head in upright position, a plurality of normally horizontal rollers on said head, means to retain said rollers in planes approximately parallel with the plane of said frame, a cylinder frictionally supported on said rollers, a gear on one of said rollers, means to rotate said gear and roller, and means bearing on said cylinder to record the change in relative position of said head and said cylinder.

4. In a device of the character described, a supporting frame, a cylindrical head, means to hold said head in vertical alignment, a cylinder frictionally supported on rollers on said head, means to rotate one of said rollers and said cylinder, means to incline said rollers in planes parallel with the plane of said supporting frame, a record sheet on said cylinder and a pen supported on said head and bearing on said sheet.

5. In a device of the character described, a support, a tubular head, gyroscopic means to retain said head in upright position, a cylinder frictionally mounted in spaced relation around said head, means to rotate said cylinder, means to cause said cylinder to fall or rise relative to said head as said support is inclined downwardly or upwardly, a record sheet on said cylinder and a pen supported on said head and bearing on said sheet.

6. In a device of the character described, a support, a head thereon, means to hold said head upright, friction rollers rotatable on pins journalled radially in said head, a cylinder supported on said rollers, means including one of said rollers to rotate said cylinder, means to regulate the angular position of said rollers relative to said cylinder, a record sheet on said cylinder and recording means mounted on said head bearing on said sheet.

7. In a device of the character described, a support, a head thereon, stabilizing means to hold said head in uniform position, a cylinder mounted frictionally on said head, means on said support to regulate the position of said cylinder on said head and a marker on said head adapted to contact with a record sheet on said cylinder.

In testimony whereof, I hereunto affix my signature this the 16th day of July, A. D. 1923.

REGINALD C. COLLEY.